Oct. 19, 1954    R. L. GHEEN ET AL    2,692,155
GASKET FOR PIPE COUPLING
Filed Aug. 26, 1950
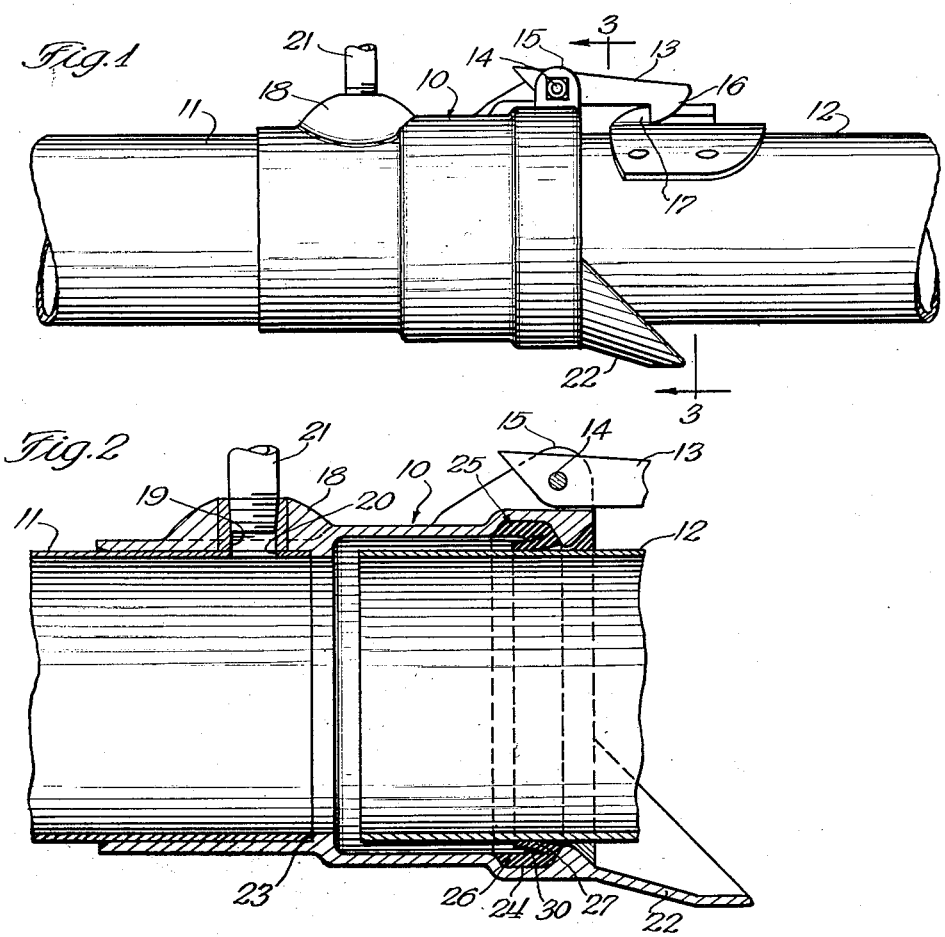
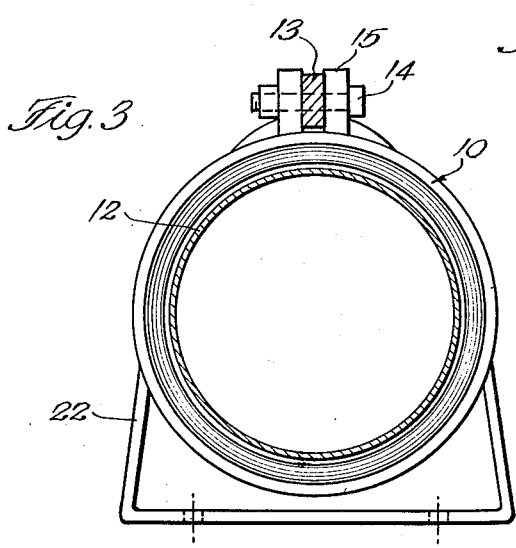
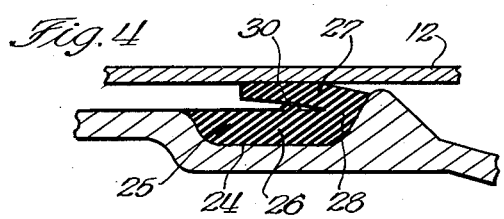
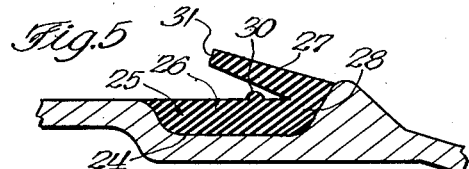
INVENTORS
Robert Lee Gheen
Ernest Lee Gheen
BY
Cook and Achermeshorn
ATTORNEYS Patented Oct. 19, 1954

2,692,155

UNITED STATES PATENT OFFICE 2,692,155

GASKET FOR PIPE COUPLING

Robert Lee Gheen and Ernest Lee Gheen,
Eugene, Oreg.

Application August 26, 1950, Serial No. 181,612

1 Claim. (Cl. 288—5)

This invention relates to improvements in gaskets for pipe joints and couplings, and to the improved coupling resulting therefrom.

The invention is particularly applicable to couplings for connecting the ends of pipe sections in pipe lines for irrigation and field work and the like, in which it is necessary that a fluid-tight joint be provided between the pipe ends. It is likewise necessary that the coupling permit angular movement between lengths of pipe and be provided with a gasket sufficiently flexible to make a water-tight seal when the pipe sections are disposed in positions of axial angularity with respect to each other, as when changing the course of direction or elevation of the pipe. As such pipe sections are disassembled and moved to different locations from time to time, it is further necessary that the gasket and coupling member be so constructed that a pipe section therein may be withdrawn therefrom without damaging the gasket or coupling member.

It is, accordingly, an object of the invention to provide a gasket for a pipe coupling having resilient reinforcing means for the pipe engaging element of the gasket to insure a positive grip on the pipe and provide a fluid-tight seal, which is flexible and effective through a range of relative angular displacement of the pipe sections.

Another object of the invention is to provide an improved gasket so constructed that the pipe sections may be easily withdrawn from the coupling member to facilitate quick attachment and detachment of the coupling and pipe sections.

Another object is to provide a pipe-engaging member as a part of the gasket for a pipe coupling which is sufficiently rigid and durable as not to be damaged when a pipe is withdrawn from the coupling during disassembly.

Another object is to provide a gasket which is constructed so as to withstand high fluid pressure, and which is economical to manufacture, and simple to install.

The invention will be better understood and additional objects and advantages will become apparent from the following description taken in connection with the accompanying drawings which illustrate a preferred form of the invention. It is to be understood, however, that the invention may take other forms, and that all such modifications and variations which will occur to persons skilled in the art are included in the scope of the invention.

In the drawings:

Figure 1 is a side elevation view showing a pipe coupling in which the present gasket may be used;

Figure 2 is a longitudinal sectional view through the coupling showing the gasket of the present invention in position;

Figure 3 is a transverse sectional view of the pipe coupling with which the present gasket is used, taken on the line 3—3 of Figure 1;

Figure 4 is an enlarged sectional detail view showing a pipe inserted in the coupler with the gasket forming a fluid-tight joint; and Figure 5 is an enlarged sectional detail view showing the form of the gasket when the pipe has been removed from the coupler.

The gasket of the present invention is used with a coupler of the type shown in Figures 1, 2 and 3. The coupler is used for connecting pipe sections and providing a water-tight joint, and the pipe lines so formed are extensively used for irrigation or for other purposes wherein fluid-tight pipe joints are necessary. It is also necessary that the device be capable of providing a joint sufficiently interconnected and having sealing means so constructed as to withstand high fluid pressures, as are common in water mains.

The coupler 10 is of conventional construction, and is adapted to connect together in a fluid-tight joint the adjoining ends of two pipe sections 11 and 12. A locking lever 13 is pivotally mounted on the coupler 10 by pivot pin 14 carried by ears 15. The lever 13 has a flat-sided hook member 16, and, to hold the pipe 12 firmly within the coupler 10, the pipe 12 has a keeper 17 secured in such position as to cooperate with the hook 16, as seen in Figure 1. A boss 18 is mounted on the top of the coupler 10 and has an internally threaded bore 19 cooperating with an aperture 20 in the pipe 11. The boss 18 receives a threaded riser pipe 21 upon which a sprinkler head or other device for delivering water may be mounted. The coupling is supported by brackets 22, serving as feet members, as seen in Figures 1, 2 and 3.

As best seen in the sectional view of Figure 2, the coupler 10 receives the two pipe ends 11 and 12, the pipe end 11 being received against shoulder 23 and firmly held in the left end of the coupling, as illustrated, by means of a press fit. The pipe section 12 is received in the right-hand end of coupler 10, as illustrated, in telescoping relation, and the relative diameter sizes of the pipe section and the interior of coupler 10 are such as to provide an annular space therebetween and thereby enable angular displacement relative to each other. The pipe 12 is held linearly in position in the coupling by the locking lever 13 in engagement with keeper 17. A water-tight joint is formed by positioning a packing gland or gasket 25 in said annular space so as to maintain resilient contact between the mating surfaces of the coupling and pipe. The gasket, which is more fully hereinafter described, is seated in an annular channel or groove 24 formed, as illustrated, in the inner wall of the coupler.

The gasket 25 which characterizes the instant invention is of substantially V-shape and is constructed of resilient material such as rubber to form a water-tight seal against a pipe. The gasket comprises, as illustrated in Figures 4 and 5, a body portion 26 and an inwardly presenting flange or lip portion 27 connected at its root end to said body portion, as at the base 28 of the V. The body portion 26 is correspondingly shaped to, and seats in, the annular groove 24 in the wall of the coupling, and the lip portion 27 extends inwardly, as seen in Figure 5, for sealing engagement with the free end of a pipe section 12 to be received within the coupling.

The gasket is provided with an annular bead 30 formed on the inner face of the body portion 26 intermediate the ends of the body and spaced with reference to the root of the flange 27 so that a substantial part of flange 27 overhangs the bead. The bead as thus constructed serves as an abutment and provides a resilient support or fulcrum for the flange 27 and urges the flange into engagement with a pipe section, as illustrated in Figure 4. By reason of the bead 30 and its position relative to flange 28, a substantial part of the length of flange 27 will be urged as a cantilever in continuous engagement with the pipe 12 when in assembled relation and the flange 27 cannot thus be flattened against the body 26 of the gasket to allow water to seep through the joint. Water under pressure passing through the pipes bears against the opposed inner surfaces of the flange 27 and body 26. Such pressure tends to spread these members apart and firmly seats the gasket 25 in the groove 24 and causes flange 27 to engage the outer periphery of pipe 12. A fluid-tight joint is thus formed, and as long as pressure remains in the system the gasket will be firmly seated against the two elements.

An important advantage of the bead 30 is that it prevents the flange 27 from lying tightly against the body member 26 by reason of the weight of the pipe or by reason of loss of resiliency due to aging of the gland material. It is evident that if the flange 27 were allowed to lie on the body 26, no effective seal would be present and seepage would result. With the bead 30 resiliently supporting the flange 27, water pressure from the line can bear against the inner, opposed surfaces of the gasket to insure a fluid-tight joint at all times. As a further advantage, it may be observed that the bead 30 prevents adhesion of the flange and body portions, as might otherwise occur when the two were firmly pressed in contact against each other and maintained in such position for an extended time.

It will be understood that the bead may be provided on the body portion 26, as illustrated and described, or it may be provided on the face of flange 27 opposed to the body portion, with equal satisfaction, its location being a matter of choice. However, the bead should be disposed linearly of the body and flange portions, so as to afford a breaking point for the flange intermediate its ends and sufficiently close to its root to insure flexible, resilient engagement of the flange portion with the pipe for a considerable part of the length of the flange portion. It will also be understood that the bead may take different shapes and forms within the spirit of the invention. It may be semicircular as illustrated, it may be a ridge of square or V-shape cross section, or other rib-like protruberance.

The flange 27 is formed with a blunt end 31, and of a thickness so as to be sturdy but yet yieldable so as to allow the water pressure to seat it against the outer periphery of the enclosed pipe 12. The rigidity of the flange 27 also prevents it from buckling under the action of high water pressure. Heavy construction of flange 27, as thus described, enables a pipe to be easily withdrawn from the coupling when the pipe lines are to be dismantled. Gaskets having lips or flanges terminating in feather edges, as is common in conventional constructions, makes the withdrawal of a pipe very difficult. The feather edge of such a flange is usually damaged when the pipe is withdrawn, because the lip rolls and jams between the body portion of the gasket and the pipe. Disassembly is very difficult in such constructions and the gaskets will not stand up under frequent assembly and disassembly of the joint. The formation of flange 27 with a blunt end avoids such result.

In some types of pipe couplings, it may be desirable that the annular groove or recess in which the gasket is seated be provided on the male member of the coupling, as in these drawings on pipe 12, and that the gasket then be reversed with the flange member corresponding to flange 27 presenting outwardly so as to engage the interior wall of the female or enclosing member, whether it be a pipe or union.

Having thus described our invention, what is claimed is:

An annular gasket of resilient material for forming a seal between quick detachable telescoping pipe ends, said gasket comprising a body and a divergent flange, these parts having a common end where the flange is connected to said body, said flange having a free end extending toward the other end of the gasket, said flange being uniformly tapered in the direction of its free end, an annular bead formed on the body confronting and engageable with said flange adjacent the conjunction of the body with the flange so that a substantial length of the flange overhangs the bead, said bead and flange providing a fulcrum-lever construction whereby said common end acts with said annular bead to urge the free end of the flange against a pipe end received within the circle of the flange and permitting facile connection and disconnection of the pipe ends by relative telescoping movement.

References Cited in the file of this patent

UNITED STATES PATENTS

| Number | Name | Date |
| --- | --- | --- |
| 1,712,003 | Hubbard | May 7, 1929 |
| 1,808,262 | Hele-Shaw | June 2, 1931 |
| 1,867,891 | Reynolds | July 19, 1932 |
| 1,996,287 | Fisher | Apr. 2, 1935 |
| 2,007,501 | Millmine | July 9, 1935 |
| 2,294,142 | Turner | Aug. 25, 1942 |
| 2,465,175 | Schwarz | Mar. 22, 1949 |